United States Patent Office 2,812,266
Patented Nov. 5, 1957

2,812,266

PROCESS FOR DISPERSING ALUMINUM ROSINATE

Brage Golding, Lafayette, Ind., assignor to Purdue Research Foundation, Lafayette, Ind., a corporation No Drawing. Application December 20, 1954,
Serial No. 476,568

13 Claims. (Cl. 106—173)

My invention relates to the preparation of a pigmented coating material, such as varnishes, lacquers, oil paints and the like, this application being a continuation-in-part of my co-pending abandoned application Serial No. 166,071, filed June 3, 1950, entitled, Process of Preparing Pigmented Coatings.

One of the objects of my invention is to accomplish a complete dispersion of aluminum rosinate as a flatting pigment in a coating covering material without the necessity of first milling the pigment.

Broadly speaking, my novel process comprises preparation of an aluminum salt of a resin of the class consisting of rosin, dehydrogenated rosin and hydrogenated rosin in the form of an aqueous slurry, extracting the freshly prepared aluminum resinate from the aqueous slurry with a substantially water-immiscible solvent, dehydrating the solvent solution, adding the dehydrated solvent solution to the coating material which is to be flatted, and precipitating the aluminum resinate in the mixture to disperse the aluminum resinate therein in uniform finely divided state.

The rosin which is employed in my process can be the rosin which is variously designated as gum rosin, wood rosin, rosin obtained from tall oil derived from coniferous wood and the like. It is essential for the production of the useful effects of the invention that the rosin be capable of forming an aluminum salt, which is soluble in a water-immiscible solvent and which solution is gelable. As noted above, hydrogenated and dehydrogenated rosin, as well as rosin itself, have such properties. Solvents which I can employ for extracting the aluminum resinate are substantially water immiscible organic solvents, such as hydrocarbons, ethers, esters, alcohols, ketones and aldehydes of aliphatic, aromatic, alicyclic or heterocyclic nature, individually or in admixture, and each of which, or the mixture of which, is not normally water soluble. Preferably a solvent is chosen which is relatively lighter or heavier than the remaining aqueous portion, when the aluminum resinate is dissolved in the said solvent, so that a satisfactory separation is effected by gravity on standing without additional process steps. Alternatively the organic and aqueous solutions can be separated mechanically by means known to the art, as, for example, by centrifugation. Precipitation and resultant uniform dispersion of the aluminum resinate can be accomplished simply by allowing the coating material containing the solvent solution of the said resinate to stand at room temperature. Heating of the coating material after incorporating the aluminum resinate solution also brings about the precipitation and uniform dispersion of the flatting agent, and is preferably employed as being more rapid.

For the purpose of illustrating my invention I have described herein a method of forming a solution of flatting pigment and accomplishing the dispersion of said flatting pigment in such coating materials as varnish and lacquer.

Referring first to the process for producing a flatting pigment in connection with a varnish coating:

In the first step of the process, aluminum sulphate and water are mixed to form a water solution. Caustic alkali, for example, sodium hydroxide, and a caustic soluble resin, such as gum or wood rosin, are heated in water to form a resin solution. Then such sodium resinate is added to the aluminum sulphate solution while the latter is being stirred violently so that introduction is effected at the surface of the aluminum sulphate solution and the resulting resinate is worked down into the sulphate solution to produce a very soft, non-granular, white to cream-colored slurry. If necessary, additional water is added to produce a slurry in which the resulting aluminum resinate comprises about 10% and the water about 90% by weight.

This slurry is preferably aged for at least 20 to 24 hours and may be held indefinitely without loss of usefulness, so long as there is sufficient water remaining. The water appears to exclude oxygen from the aluminum resinate and thus maintains its chemical properties necessary for subsequent utilization. Dry powdered aluminum resinate, when mixed with water in the same proportions, does not function, or if it does, it does so very erratically insofar as flat effects are concerned in the subsequent varnish.

Consequently, the term "freshly prepared aluminum resinate" as used herein refers to a resinate slurry-like material which may be thinned down to the proper water concentration, if necessary, but which never has been dried. The term "freshly prepared" refers equally as well, as thus used, to slurries held in storage under the condition specified for several days or weeks. Such slurry should be cooled for reasons assigned hereinafter and may be cooled by standing or by artificial means.

To prepare a typical slurry, the following method and proportions may be used:

Dissolve 155 lbs. aluminum sulfate in 200 gallons of water. In another kettle dissolve 38 lbs. of caustic soda in 360 gallons of water. Heat this solution to boiling and, while heating, add 340 lbs. of rosin. Keep solution at or near boiling until all rosin has dissolved, then add an approximately equal quantity of cold water so that the final temperature of the resinate solution is about 130° F.

Add the resinate solution slowly to the aluminum sulfate solution with constant vigorous stirring. This will produce about 1000–1100 gallons of a creamy suspension of an aluminum resinate in the water.

About 1100 gallons of said slurry is mixed with 200 gallons, more or less, of a solvent material of the type hereinbefore set forth and identified. Preferably the usual solvents employed in varnish manufacture are utilized, and in this instance a mixture of 28 gallons of toluene, 114 gallons of naphtha and 50 gallons of mineral spirits is used. The solvent mixture is gradually added to the container having the cold slurry therein while the slurry is agitated by moderately fast stirring at a speed sufficient to keep the solvent solution suspended and distributed in the slurry, but not fast enough to cause emulsification. The time required to effect this mixture is in the neighborhood of about 10 minutes and it is carried out substantially at room temperature or at a colder temperature if the slurry has been mechanically refrigerated or cooled.

After the addition above has been effected, agitation is discontinued and the liquid mixture is allowed to separate. The result is that a pale to dark (depending upon the composition and purity of the ingredients), practically clear, resinate solution rises to the top, or settles to the bottom of the water, in amount about 250 gallons, such solution collecting thereon or thereunder and coalescing. The remaining liquid is principally water which may be drained from the bottom of the container, or the resinate solution may be decanted or otherwise removed from the top and transferred to another container or vice versa if settled to the bottom. This solution is then dried by the addition of from 100 to 300 pounds of an inert dehydrating agent, such as anhydrous calcium chloride, preferably in flake form, and whatever cloudiness was theretofore present in the solution disappears, resulting in a dark clear liquid. The drying agent is added to the liquid during a period of about ten minutes accompanied by stirring or agitation sufficient to keep the flake material in suspension.

Following this addition, the material is permitted to settle for ten minutes, more or less, during which time almost all of the drying agent will settle out, taking with it substantially all of the free water and leaving in the solution at the most about 1% to 5% of the drying agent, and but a very small amount, if any, of free water.

The resulting liquid is clear, transparent, and more or less colored and is a gelable solution which, if it stands at room temperature for about 3 to 5 hours, spontaneously gels into a firm gel, and if heated it rapidly gels.

To test the suitability of the said liquid for flatting purposes, a small sample of the gelable solution is heated to approximately 150° to 170° F., and if it gels, the material then is suitable in the next step and will effect flatting in the subsequent varnish addition. This clear liquid is then preferably subjected to a suitable separation process to effect the removal of the minor amount of drying agent present in extremely finely divided form, and the exceptionally minor amount of water that might not have been otherwise taken care of before. Such separation may be economically and expeditiously effected by centrifugation which produces the clear flatting liquid, which appears to be a true solution. The desired clear or colored varnish is then mixed with this liquid. It is preferred to add the varnish to the gelable solution although the reverse addition may be utilized, inasmuch as the two solutions are mutually compatible.

Approximately equal weights of both liquids are mixed together. When but 40% of the gelable solution and 60% of the varnish are mixed, the final product will be a flat varnish but not so flat as when equal amounts are used, or as when 60% of the gelable solution is mixed with 40% of the varnish. The degree of flatness desired in the resulting coating material and the character of the varnish will determine the percentages to be here used.

The final two steps of the process are as follows: First, admixture is effected by pouring one liquid into the other accompanied by moderate stirring, and the mixture is then heated. From about 120° F. to 200° F. has been found a satisfactory range of heating although 150° F. to 170° F. is preferred. This is also accompanied by moderate stirring; and while heretofore the clear resinate solution if so heated, gelled, the mixture now does not gel but instead precipitation of all or part of the aluminum resinate in the varnish in uniformly dispersed form takes place and effects the flatness desired. Secondly, and following the heating and stirring, the mixture is allowed to cool naturally or artificially accompanied by stirring.

To eliminate the possibility of pre-gelling in commercial production, it is preferred that, prior to centrifuging, a minor amount of varnish be mixed with the gelable solution. It has been found that this prevents undesired gelling while centrifuging. It appears that at this stage the material is in critical condition and may remain as a solution or can quickly change over to a gel. The varnish addition introduces a time lag element providing sufficient time for the centrifuging separation.

It has also been ascertained that heating in the last step produces the flatting characteristics desired more quickly and uniformly in the resulting product, although a flatted product can be obtained by permitting the mixture to stand at room temperature.

The invention eliminates grinding and milling operations and the entire process from the time it starts from the solution addition step to the final flat base product, if mechanical refrigeration be used, requires approximately four hours.

The time elements for commercial utilization of the process were: 10 to 20 minutes to stir the solvent into the slurry; 5 minutes for the solvent layer to rise to the top of the water; 20 to 30 minutes for draining of the water; approximately 10 minutes for drying; approximately 10 minutes for settling; 30 to 45 minutes for centrifuging; 10 minutes, more or less, to mix. The centrifuging time, of course, may be reduced by using a larger capacity centrifuge and the water draining time could be reduced by the use of suitable means or larger sized drain apparatus.

In the final step it takes about ½ hour to mix and heat the ultimate mixture and about 20 minutes to 2 hours to cool it, depending upon whether artificial or normal cooling is utilized. Thus the overall time runs from 2½ to 4½ hours.

The resulting flat base material is then mixed with a clear varnish, or varnishes, to produce the commercial product, and the proportions are varied so as to produce in the final product various degrees of flatness from 0 to 90 ASTM Gardner Glossmeter, 0 being the flattest varnish and 90 indicating a glossy varnish.

For the manufacture of a flat lacquer, a similar or identical aluminum resinate slurry is extracted with a mixture of solvents which may be similar or identical to those used in flat varnish manufacture; i. e., preferably a mixture of aliphatic and/or aromatic hydrocarbons. The same process is subsequently carried out with respect to separating, removing water, drying and centrifuging.

To this gelable solution is added preferably about an equal volume of butyl acetate, with or without butyl alcohol admixed therewith. This clear solution is then heated, as with flat varnish manufacture, to from 150° to 170° F. accompanied by stirring. A complete precipitation is thereby effected, the clear solution turning opaque and consisting of a dispersion of the aluminum resinate in the solvents.

In order to control the size and quality of the dispersion, and further, to prevent premature gelation, it is preferred to add to the clear solution of the aforementioned solvents and gelable solution, during or after drying, a small quantity of a soft resin, such as an alkyd varnish, of the type commonly used in lacquers, or an oil, blown or unblown, such as is commonly used in lacquers, in order to obtain a product which is finer in particle size and better dispersed. A quantity in the neighborhood of 30 to 70 gallons of such a varnish or oil to about 220 gallons of gelable solution has been found to be preferable, the more varnish or oil added, the finer the particle size and the less the quantity of the aluminum resinate there is precipitated upon the subsequent heating.

There is thus produced a flatting solution which may be mixed with other components normally used in lacquer manufacture to produce a lacquer of varying degrees of flatness, from a dead flat to a fairly glossy product, depending upon the amount of this flatting solution used.

A typical formulation, giving a flat lacquer is as follows:

160 gal. ½ sec. nitrocellulose solution
27 gal. 8 lb. cut maleic resin
73 gal. alkyd varnish
36 gal. blown linseed oil
9 gal. tricresylophosphate
350 gal. of a suitable mixture of solvents used in lacquers
220 gal. flatting solution To produce a glossier lacquer, a quantity of clear lacquer is added to the flat lacquer in a quantity sufficient to give the gloss desired.

A further example of carrying out the process of my invention is as follows: the procedure of either of the preceding examples is followed, using the same proportions of the various substances as therein set forth, but using in place of rosin an equal amount of dehydrogenated rosin, such as that supplied under the trade name "Resin 731" by the Hercules Powder Company. The slurry of aluminum resinate which is produced is extracted with the selected solvent such as naphtha, toluene or a mixture of solvents, dehydrated with calcium chloride and centrifuged to produce a clear gelable solution. This dehydrated solution containing a freshly prepared aluminum resinate (an aluminum salt of dehydrogenated rosin) in a substantially water-immiscible solvent is mixed with the selected varnish or lacquer coating material in the same manner as disclosed hereinabove to produce flat coatings.

Still another example of the process of the invention is as follows: the procedure set forth hereinabove in the various examples is followed, using the same proportions of the substances as set forth therein, but using, in place of rosin or dehydrogenated rosin, an equal amount of hydrogenated rosin, such as that available commercially under the trade name "staybilite," and furnished by the Hercules Powder Company. The aqueous slurry of freshly prepared aluminum resinate which is formed is extracted with the selected water-immiscible solvent, the extract is dehydrated with calcium chloride and centrifuged. The clear, dehydrated, gelable solution, which contains a freshly prepared aluminum salt of hydrogenated rosin in a substantially water-immiscible solvent, is mixed with the selected varnish or lacquer coating material. This mixture is heated to precipitate the aluminum resinate in uniform finely divided state, whereby a flatted coating material is provided, in the same way as described hereinabove.

The invention claimed is:

1. The process for effecting the complete dispersion of a flatting pigment in an organic coating material of the class consisting of varnishes and lacquers, which comprises extracting a freshly prepared aqueous slurry of an aluminum salt of a resin selected from the class consisting of rosin, hydrogenated rosin and dehydrogenated rosin with a substantially water-immiscible organic solvent capable of forming a gellable solution with the said aluminum salt, dehydrating the extract with an inert solid chemical dehydrating material, preparing a substantially uniform mixture of the dehydrated extract with a coating material of the class consisting of varnishes and lacquers, and permitting the mixture to stand at room temperature, thus precipitating the aluminum resinate from the resulting mixture to disperse the said aluminum resinate therein in uniform finely divided state.

2. The process according to claim 1, wherein the resin is rosin.

3. The process according to claim 1, wherein the resin is hydrogenated rosin.

4. The process according to claim 1, wherein the resin is dehydrogenated rosin.

5. The process according to claim 1, wherein the coating material is varnish.

6. The process according to claim 1, wherein the coating material is lacquer.

7. The process for effecting the complete dispersion of a flatting pigment in an organic coating material of the class consisting of varnishes and lacquers, which comprises extracting a freshly prepared aqueous slurry of an aluminum salt of a resin selected from the class consisting of rosin, hydrogenated rosin and dehydrogenated rosin with a substantially water-immiscible organic solvent capable of forming a gellable solution with the said aluminum salt, dehydrating the extract with an inert solid chemical dehydrating material, preparing a substantially uniform mixture of the dehydrated extract with a coating material of the class consisting of varnishes and lacquers, and heating the mixture to disperse the said aluminum resinate therein in uniform finely divided state.

8. The process according to claim 7, wherein the resin is rosin.

9. The process according to claim 7, wherein the resin is hydrogenated rosin.

10. The process according to claim 7, wherein the resin is dehydrogenated rosin.

11. The process of forming a flat base coating material of the class consisting of varnishes and lacquers which comprises subjecting a freshly prepared aqueous slurry of an aluminum salt of a resin selected from the class consisting of rosin, hydrogenated rosin, and dehydrogenated rosin to extraction with about one-fifth its volume of a substantially water-immiscible organic solvent capable of forming a gellable solution with the said aluminum salt, subjecting the extract to drying with an inert solid dehydrating agent to produce a gelable solution, preparing a substantially uniform mixture of the said solution with the desired amount of a coating material of the class consisting of varnishes and lacquers, and heating the mixture to precipitate the aluminum resinate in uniform finely divided state.

12. The process for effecting the complete dispersion of flatting pigment in a varnish, which comprises extracting a freshly prepared aqueous slurry of an aluminum salt of rosin with a substantially water-immiscible organic solvent capable of forming a gellable solution with the said aluminum resinate, dehydrating the extract with anhydrous calcium chloride, mixing the dehydrated extract with varnish, and heating the mixture at a temperature in the range of about 120 to 200° F. to precipitate the aluminum resinate in uniform finely divided state.

13. The process for dispersing aluminum resinate flatting pigments in coating materials, which comprises preparing a substantially uniform admixture of a coating material of the class consisting of varnishes and lacquers with a substantially water-free gellable solution of an aluminum salt of a resin of the class consisting of rosin, hydrogenated rosin and dehydrogenated rosin prepared by extraction of a freshly prepared aqueous slurry of said aluminum salt with a substantially water-immiscible organic solvent capable of forming a gellable solution with the said aluminum salt, and heating the said admixture to precipitate the said aluminum resinate therein in uniform finely divided state.

References Cited in the file of this patent

UNITED STATES PATENTS

| Number | Name | Date |
| --- | --- | --- |
| 2,113,496 | Roon et al. | Apr. 5, 1938 |
| 2,139,134 | Roon | Dec. 6, 1938 |
| 2,267,148 | Boner | Dec. 23, 1941 |
| 2,447,064 | Gebhart et al. | Aug. 17, 1948 |
| 2,541,977 | Earhart | Feb. 20, 1951 |